219-121. SR
7-1-75 XR 3,893,129

United States Patent [19]

Endo et al.

[11] 3,893,129

[45] July 1, 1975

[54] LIGHT BEAM RECORDING DEVICE

[75] Inventors: Hiroshi Endo; Hiroshi Oono; Shigenori Oosaka, all of Asaka, Japan

[73] Assignee: Fuji Photo Film Co., Ltd., Kanagawa, Japan

[22] Filed: July 24, 1974

[21] Appl. No.: 491,504

[30] Foreign Application Priority Data

July 27, 1973 Japan ................................ 48-85333

[52] U.S. Cl. ...... 346/77 E; 178/6.6 TP; 219/121 L; 250/234; 250/201; 356/125; 346/76 L

[51] Int. Cl. ........................ G02b 7/02; G01d 15/14

[58] Field of Search ................ 346/76 L, 77 E, 108; 250/234, 204, 201; 356/125; 178/6.6 TP; 340/173 TP; 219/121 L

[56] References Cited

UNITED STATES PATENTS 3,614,456 10/1971 Hamisch ............................ 250/234

3,825,323 7/1974 Landwer ....................... 346/76 L X

*Primary Examiner*—Joseph W. Hartary

*Attorney, Agent, or Firm*—Fleit & Jacobson

[57] ABSTRACT

A phototube is located behind a thermoplastic recording medium, on which a laser beam is focused to record information thereon, to receive light passing therethrough. When the laser beam is accurately focused on the recording medium to record a sharp line, the thermoplastic recording medium is deformed by the concentrated laser beam of high intensity. The laser beam passing through the deformed part of the recording medium is diffracted and scattered, and accordingly, the amount of light received by the phototube changes. By this change in the amount of light, the focusing point is detected and the laser beam focusing means is controlled to always focus the beam sharply on the recording medium. In a preferred embodiment, two phototubes are employed to receive light passing straight through the recording medium and light diffracted and scattered therethrough, respectively.

13 Claims, 7 Drawing Figures

LIGHT BEAM RECORDING DEVICE

BACKGROUND OF THE INVENTION

1. Field of the Invention

This invention relates to a light beam recording device, and more particularly to a device for recording information on a recording medium by use of a collimated light beam of high intensity such as a laser beam. The light beam recording device in accordance with the present invention is provided with an automatic focusing means to enhance the resolving power of the recorded information.

2. Description of the Prior Art

It has been well known in the art to record information on a recording medium by use of a laser beam. In the laser beam recording device, it is desirable to accurately focus the laser beam on the recording medium to obtain sharp lines of recording. If the laser beam is not sharply focused on the recording medium, the diameter of the light spot on the recording medium becomes large and the resolving power of the recorded image or information is deteriorated. In a device for recording information on a microfilm in addition to images recorded thereon, the laser beam is particularly desired to be sharply focused. Further, particularly when the output power of the recording laser beam is small, the light beam must be sharply focused on the recording medium.

In order to obtain the sharply focused laser beam, the conventional laser beam recording device is usually provided with a focus adjusting means. Since the light spot focused on the recording medium is of extremely small diameter as small as several to ten microns and it is almost impossible to adjust the focus on the recording medium by the eye, the focus adjusting means provided in the conventional laser beam recording device employs an optical or electrical means for amplifying the condition of the light spot focused on the recording medium. As for the optical means, a microscopic device for viewing the focused light spot in enlarged scale is adopted. As for the electrical means, is adopted for instance a focus detecting device comprising a grating placed on the plane of the recording medium so as to receive the laser beam focused and scanned thereon, a phototube for receiving light passing through the grating and converting the amount of light received thereby to an electric signal, and a cathode ray tube connected with the phototube to indicate the amplitude of the variation in the amount of light of the scanning laser beam passing through the grating. By the amplitude indicated by the cathode ray tube, the sharpness of the light spot focused and scanned on the grating by the laser beam is represented.

The former focus adjusting means employing the optical means using a microscopic device, however, is disadvantageous in that it is difficult to be automatically operated. The latter focus adjusting means employing the electrical means using a grating is disadvantageous in that it is complicated and costly.

SUMMARY OF THE INVENTION

In the light of the foregoing observations and description of the conventional laser beam recording device, the primary object of the present invention is to provide a light beam recording device provided with a focus adjusting means which can be automatically operated.

Another object of the present invention is to provide a light beam recording device provided with an automatic focusing means which is simple in construction and accordingly is easy to be manufactured.

Still another object of the present invention is to provide a light beam recording device provided with a focus adjusting means which does not need an image enlarging lens system of high magnification.

A further object of the present invention is to provide a light beam recording device which is able to record information on a recording medium of various thickness.

The light beam recording device in accordance with the present invention is particularly suitable for a light beam recording device using a light beam of high intensity such as a laser beam which records information in sharp lines on a thermoplastic recording medium such as a microfilm. The thermoplastic recording medium is deformed by the light beam of high intensity when it is heated by the light spot sharply focused thereon, and accordingly, the light beam passing through the recording medium is diffracted and scattered by the deformed part of the recording medium. The present invention utilizes this phenomenon and employs a phototube which receives light passing through the recording medium and detects the focusing point by detecting the point where the amount of diffracted light received thereby becomes highest. In a system for recording information on a recording medium without deforming the recording medium by heat or on a photosensitive recording material at a high speed without deforming the material, the focus adjustment is conducted before and separately from the recording process.

In a preferred embodiment of the present invention two phototubes are employed to receive light passing straight through the recording material and light diffracted therethrough to enhance the effect of detection of the focusing point.

It will be noted that the light beam recording device in accordance with the present invention is applicable to a marking device in which, for instance, a position of imperfection of a web such as scratches or the like is indicated on the web or on a separate recording material.

Further, it should be noted that the focus adjusting means employed in the light beam recording device in accordance with the present invention does not detect the point where the diameter of the light spot formed on the surface of the recording material is minimized, but detects the point where the light beam deforms the thermoplastic recording material most effectively. Accordingly, the light beam recording device in accordance with the present invention has high performance in the effect of recording.

PREFERRED EMBODIMENTS OF THE INVENTION

Figure 1:
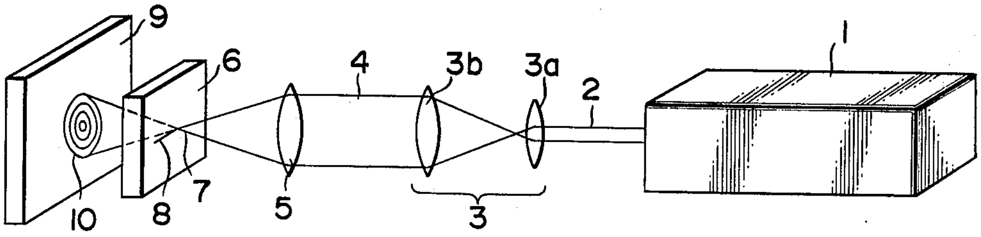
FIG. 1 is a longitudinal representation showing the principle of formation of a diffraction pattern in the laser beam recording process which is utilized in the present invention.

Referring to FIG. 1 which shows the principle of formation of a diffraction pattern in the laser beam recording system, a laser beam source 1 such as a HeNe laser, an Ar laser and a Kr laser generates a high intensity collimated laser beam 2 of a visible ray or near infrared radiation. The laser beam 2 is enlarged of its diameter by a light beam enlarging lens system 3 comprising two convergent lenses 3*a* and 3*b*. The laser beam 2 is converged and then diverged by the first convergent lens 3*a* as shown in FIG. 1, and collimated by the second covergent lens 3*b* thereof. Then, the enlarged laser beam 4 is converged to a light spot 7 focused on a recording material 6 by a convergent lens 5. The diameter $d$ of the light spot 7 focused on the recording material 6 is represented by $d = 1.22\ F\lambda$, where F is the F-number of the convergent lens 5 and $\lambda$ is the wavelength of the laser beam. The F-number of the convergent lens 5 is represented by $F = f/D$, where $f$ is the focal length of the convergent lens 5 and $D$ is the diameter thereof. Practically, when the wavelength $\lambda$ of the laser beam is $0.6328\mu$ and the F number F of the convergent lens 5 is 2, the diameter $d$ of the light spot 7 becomes $d=1.22\times 2\times 0.6328 \approx 1.5\mu$. Thus a light spot 7 having diameter of about 2 microns can be obtained. In practice, the diameter of the light spot 7 becomes a little larger than 2 microns owing to lens aberrations. As the light spot 7 moves in a line on the recording material 6 by the laser beam scanning operation, a line 8 is recorded thereon. The line 8 is formed by deforming by heat the surface of the recording material 6 such as a photosensitive film carrying a silver salt emulsion layer or a diazo type recording layer.

Since the laser beam has extremely high coherency and the coherent length is as long as several meters to several tens of meters, laser beams diffracted and scattered by the deformed part of the recording material 6 are interfered with each other. If a projection screen 9 is placed behind the recording material 6, a diffraction pattern 10 can be seen thereon as shown in FIG. 1. Although the diffraction pattern 10 is illustrated as concentric circles in FIG. 1, the shape of the diffraction pattern is usually not circular in practical cases. When the laser beam is not accurately focused on the recording material, the heat intensity of the laser beam is not sufficient to deform the recording material, and accordingly, the diffraction pattern cannot be observed on the screen 9. Even if the recording material is deformed to some extent by the laser beam which is not focused sharply on the recording material, the diffraction pattern 10 formed on the projection screen 9 is not sharp.

As apparent from the above description, the laser beam can easily be focused sharply on the recording material in a short time by controlling the distance between the recording material 6 and the convergent lens 5 to obtain a sharp diffraction pattern 10 on the projection screen 9 located behind the recording material 6.

Figure 2A:
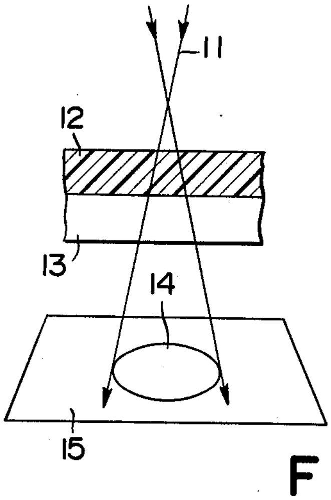
FIGS. 2A, 2B and 2C are enlarged sectional views showing the process of formation of the diffraction pattern in the laser beam recording process in accordance with this invention.
Figure 2B:
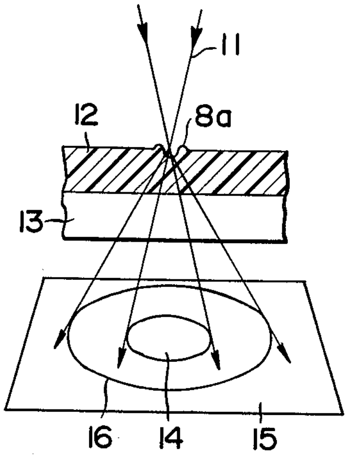
Figure 2C:
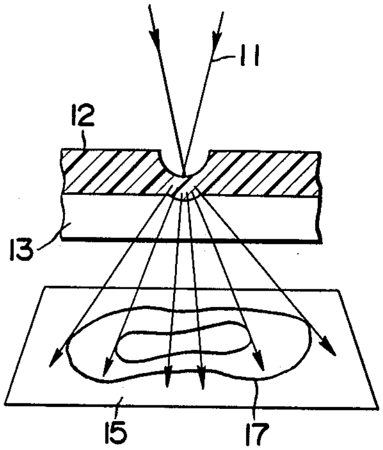

FIGS. 2A, 2B and 2C are sectional views which show the deformation of the recording material by the laser beam focused thereon. The emulsion layer 12 carried on a substrate 13 of a microfilm is darkened by exposure and development. A converging laser beam 11 impinges on the microfilm to record information on the microfilm in addition to the image or information developed thereon. In FIG. 2A, the laser beam 11 is not focused on the emulsion layer 12 of the microfilm, and accordingly, the emulsion layer 12 is not deformed by the laser beam 11. Therefore, the laser beam 11 is not diffracted by the microfilm and a light spot 14 of large diameter is projected on a projection plane 15. At the moment when the laser beam 11 is accurately focused on the surface of the emulsion layer 12 as shown in FIG. 2B, the surface of the layer 12 starts to be fused and deformed by the heat of the focused laser beam 11 as indicated at 8*a*. The laser beam 11 is diffracted and scattered by the deformed part 8*a* of the microfilm, and the light spot projected on the projection plane 15 is enlarged as indicated by 16. When the emulsion layer 12 is further fused and the substrate 13 is also deformed as shown in FIG. 2C, the laser beam 11 is diffracted and scattered in wider angle and a larger light spot of diffraction pattern 17 is projected on the projection plane 15. In practice, the diffraction pattern or projection of the scattered light is mixed on the projection plane 15 with said interference pattern 10 formed thereon described with reference to FIG. 1.

It will be noted that the same effect can be obtained if the laser beam is irradiated on the microfilm from the substrate side thereof although the laser beam is irradiated from the emulsion layer side in the above description.

Figure 3:
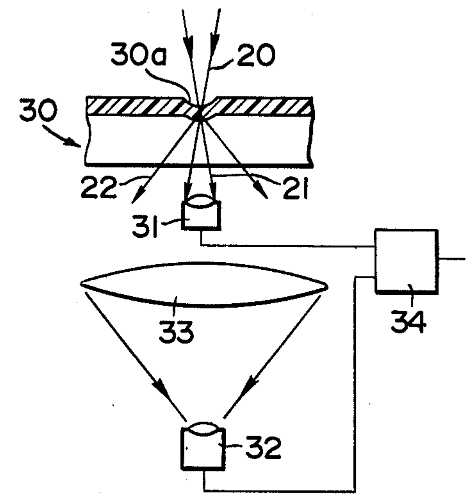
FIG. 3 is a side view of the focus detecting means employed in a preferred embodiment of the present invention shown together with an enlarged cross section of the recording medium deformed by a laser beam.

An example of the photoelectric detecting system for detecting the position where the laser beam is accurately focused on the recording material is shown in FIG. 3. Referring to FIG. 3, a first phototube 31 is located immediately under the microfilm 30 to receive the laser beam 21 passing straight through the microfilm 30 without being diffracted or scattered by the fused and deformed part 30*a* of the microfilm 30. As shown in FIG. 3, the laser beam 20 impinging and focused on the microfilm 30 is divided into the light 21 passing straight through the microfilm 30 and the light 22 diffracted and scattered by the deformed part 30*a* of the microfilm 30. A second phototube 32 is located behind the first phototube 31 and a convergent lens of large diameter 33 is provided in front thereof to converge the diffracted and scattered light 22 thereto. The first and second phototubes 31 and 32 are connected with a comparator 34 which compares the output of the first phototube 31 with the output of the second phototube 32. When the laser beam 20 is not focused on the microfilm 30, the laser beam 20 is entirely received by the first phototube 31 and the second phototube 32 receives no beam. The difference between the output of the first phototube 31 and the output of the second phototube 32 is, therefore, the largest when the laser beam 20 is not focused on the microfilm 30. When the laser beam 20 is focused on the microfilm 30 and the emulsion layer or other part of the microfilm 30 is deformed, the laser beam 30 impinging on the microfilm 30 is diffracted by the deformed part of the microfilm and the amount of light received by the second phototube 33 is increased. As the output of the second phototube 32 increases, the difference between the outputs of the two phototubes 31 and 32 is reduced. The reduction in the difference between the outputs of the two phototubes, therefore, indicates that the laser beam 20 is accurately focused on the microfilm 30.

Although the first phototube 31 is located immediately behind the microfilm 30 in the above described embodiment of the arrangement of the phototubes, it will be understood that the first phototube 31 may be located apart from the microfilm outside the luminous flux of the laser beam behind the microfilm 30 by using a light reflector such as a total reflection prism located at the position of the first phototube 31 shown in FIG. 3 instead thereof. Further, it will be noted that the first phototube 31 can be omitted by placing a light intercepting member at the position of the first phototube 31 and using only one phototube located at the position of the second phototube 32. In this case, of course, the comparator 34 is not necessary.

Figure 4:
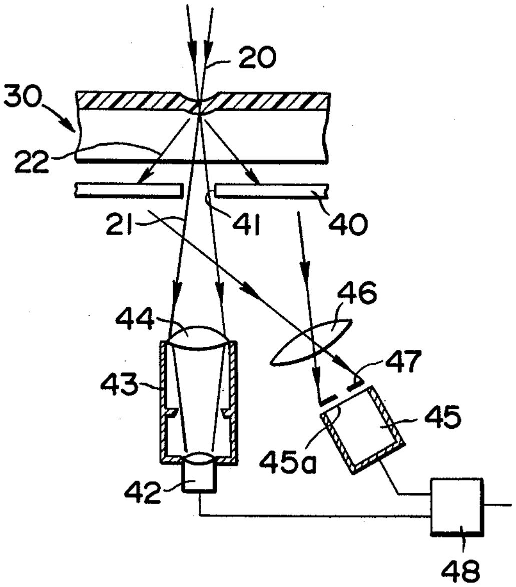
FIG. 4 is a side view of the focus detecting means employed in another preferred embodiment of the present invention shown together with an enlarged cross section of the recording medium deformed by a laser beam.

Another embodiment of the arrangement of the phototubes is illustrated in FIG. 4. Referring to FIG. 4, a light diffusing plate 40 having an aperture 41 is provided behind the microfilm 30 with the aperture 41 positioned in alignment with the point where the laser beam 20 impinges on the microfilm 30. The laser beam 21 passing straight through the microfilm 30 without being diffracted or scattered passes through the aperture 41 of the light diffusing plate 40. The diffracted or scattered light 22 is diffused by the plate 40. A first phototube 42 is located in the optical path of the laser beam 21 to receive the light passing straight through the aperture 41 of the light diffusing plate 40. The first phototube 42 is provided with a light intercepting cyclindrical member 43 and a convergent lens 44 to enhance the S/N ratio of the output signal thereof. A second phototube 45 is located beside the first phototube 42 to receive light diffused by the diffusing plate 40. An image forming convergent lens 46 is placed in front of the second phototube 45 to focus the image 47 of the diffusing plate 40 on the photoelectric face 45 *a* thereof. The first and second phototubes 42 and 45 are connected with a comparator 48 to compare the outputs of the two phototubes 42 and 45. It will be noted that the second phototube 45 may be located between the light diffusing plate 40 and the microfilm 30. Further, it will be understood that the first phototube 42 can be omitted by providing a light intercepting member in the aperture 41 of the light diffusing plate 40 and making the second phototube 45 detect the light diffused by the light diffusing plate 40. In such a case, the comparator 48 is not necessary. Further, more than one phototubes may be used for receiving the diffused light behind the microfilm 30.

Figure 5:
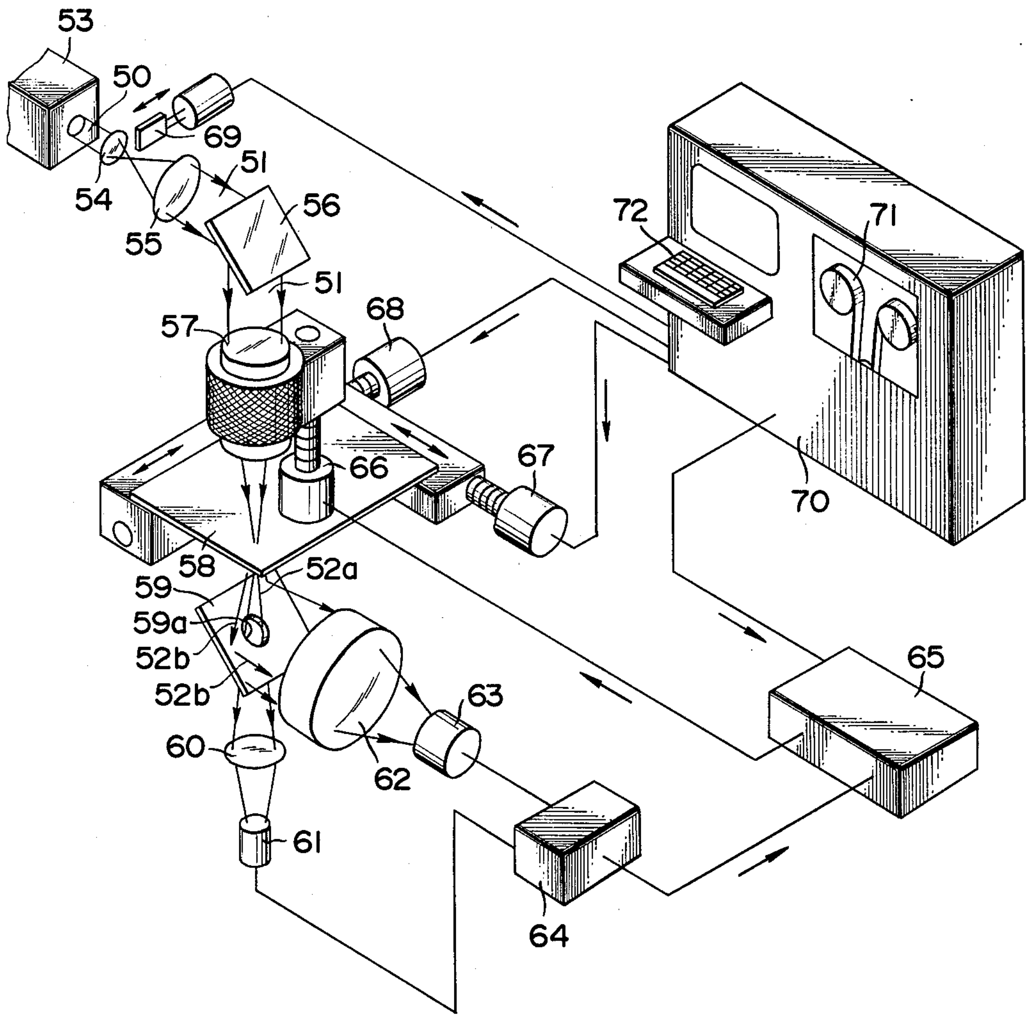
FIG. 5 is a perspective view showing another preferred embodiment of the laser beam recording device provided with an automatic focusing means in accordance with the present invention.

A preferred embodiment of the present invention will now be described in detail with reference to FIG. 5. In front of a laser beam source 53 is provided a light beam enlarging lens system comprising two convergent lenses 54 and 55 to enlarge the diameter of the laser beam 50 emitted by the laser beam source 53. A mirror 56 is provided in the optical path of the enlarged laser beam 51 to reflect the beam 51 at right angle downward to a convergent lens 57. By the convergent lens 57 the laser beam 51 is focused on the recording material 58 such as a microfilm. When the recording is not conducted, the laser beam 51 is not accurately focused on the microfilm 58 and the laser beam 51 passes through the microfilm 58 without being diffracted as shown by 52*a*. Under the microfilm 58 is provided a mirror 59 with an aperture 59*a*. The undiffracted light beams 52*a* passes through the aperture 59*a*. A convergent lens 60 is located under the aperture 59*a* to receive light passing through the aperture 59*a* and converges the light onto a first phototube 61 located thereunder. Another convergent lens 62 is located beside the mirror 59 to receive light reflected thereby. The convergent lens 62 converges the light refelcted by the mirror 59 onto a second phototube 63 provided therebehind as shown in FIG. 5. The first phototube 61 and the second phototube 63 are connected with a differential amplifier 64 which is in turn connected with a logical circuit 65. A motor 66 is associated with said convergent lens 57 which focuses the laser beam 51 on the microfilm 58. The motor 66 is connected with the logical circuit 65 so that the motor 66 may be operated in accordance with the output signal of the logical circuit 65. When the laser beam 51 is focused on the microfilm 58, the microfilm 58 is deformed by the heat of the concentrated laser beam, and the laser beam 51 is diffracted by the deformed part of the microfilm 58. The diffracted light beams 52*b* impinge on the mirror 59 and are reflected thereby toward the convergent lens 62. The diffracted light reflected by the mirror 59 and coverged through the lens 62 is received by the second phototube 63. Therefore, the output of the second phototube 63 increases when the laser beam 51 is focused on the microfilm 58. When the laser beam 51 is not focused on the microfilm 58, all the light passing through the microfilm 58 passes through the aperture 59*a* of the mirror 59 and is received by the first phototube 61.

Two driving motors 67 and 68 are associated with means for shifting the microfilm 58 in a plane. The motors 67 and 68 are connected with an information generator 70 which comprises an information storage and signal output means for giving the motors information to be recorded in terms of signals for driving the motors in *x* and *y* directions. The information generator 70 is further connected with means for operating a movable light intercepting plate 69 which is reciprocated to intercept the laser beam 50 emitted by the laser beam source 53 in accordance with the signal from the information generator. By the reciprocal movement of the light intercepting plate 69 and the two dimensional movement of the microfilm 58 both operated by the information generator 70, the information stored in the information generator 70 is recorded on the microfilm 58. The information generator 70 is provided by a magnetic tape 71 or a key board 72 attached to the generator 70. Said logical circuit 65 is connected with the information generator 70 to turn off the motor 66 for stopping the focusing lens 57 when the laser beam 50 is intercepted by the light intercepting plate 69, so that the logical circuit 65 may not operate the motor 66 erroneously when the laser beam 50 is intercepted and no light is received by the phototubes 61 and 63.

In operation, the microfilm 58 is shifted in a plane and the laser beam 50 emitted by the laser beam source 53 is intercepted by the light intercepting plate 69 in accordance with the information given by the information generator 70. When the laser beam 51 is not accurately focused on the microfilm 58, all the light passing through the microfilm 58 passes through the aperture 59*a* of the mirror 59 and is received by the first phototube 61. The output of the first phototube 61 is, therefore, much greater than that of the second phototube 63. In such a case, the differential amplifier 64 detects the large difference therebetween and the logical circuit 65 connected therewith operates to drive the motor 66 to move the focusing lens 57 to focus the laser beam 51 on the microfilm 58. When the laser beam 51 is accurately focused on the microfilm 58, the microfilm irradiated with the concentrated laser beam 51 is deformed by the heat thereof and the laser beam passing through the deformed part of the microfilm 58 is diffracted. The diffracted light 52*b* is reflected by the mirror 59 and received by the second phototube 63. Consequently, the amount of light received by the second phototube 63 is increased with respect to that of light received by the first phototube 61. When the output of the second phototube 63 reaches to a predetermined level with respect to the output of the first phototube 61, the logical circuit 65 operates to stop the motor 66. Thus, the laser beam 51 is accurately focused on the microfilm 58 and the effective recording of information can be conducted.

Although in the above described embodiment of the present invention a laser beam is used as the light beam to record information on a microfilm, it will be noted that the light beam may not be a laser beam if the light beam is of so high intensity as to deform the thermoplastic recording material by heat thereof. The recording material may be of any kind if it is thermoplastic and deformed by the concentrated light beam of high intensity such as a laser beam. For instance the recording material may be a thin film of metal. Further, the recording material which may be transparent should preferably have optically absorptivity so that it may effectively absorb the energy of light. The optical system for focusing the laser beam on the recording material may not be comprised of lenses if it converges the laser beam on the recording material. Further, the controlling of the focus of the laser beam may be conducted by moving the optical system or moving the microfilm, or moving the both relative to each other. It will further be noted that the number of phototubes is not limited to that employed in the above described preferred embodiment. The phototubes may be replaced by photodiodes or other electric means for converting the amount of light received thereby into an electric output. In addition, it is desirable to provide observation means to see the interference pattern as shown in FIG. 1 by the eye. It is of course possible to provide light guiding means such as mirrors, lenses, prisms or optical fibers between the recording material and the phototubes to enhance the effect of detection.

We claim:

1. A light beam recording device comprising a light source which emits a light beam of high intensity which is able to deform a thermoplastic material, an optical system for focusing the light beam on the thermoplastic recording medium, a photoelectric sensing means provided behind the recording medium for receiving light passing through the recording medium, and means for controlling said optical system to focus the light beam accurately on the recording medium in accordance with the output of said photoelectric sensing means.

2. A light beam recording device as claimed in claim 1 wherein said photoelectric sensing means is located behind the recording medium to receive only the light diffracted by the deformed part of the recording medium.

3. A light beam recording device as claimed in claim 2 wherein a light intercepting means is provided to prevent the light passing straight through the recording medium from being received by the photoelectric sensing means.

4. A light beam recording device as claimed in claim 1 wherein said photoelectric sensing means comprises a first photodetector which receives light passing straight through the recording medium and a second photodetector which receives light diffracted by the recording medium.

5. A light beam recording device as claimed in claim 4 wherein a logical circuit is connected with the first and second photodetectors to make an output which indicates the direction in which the optical system is to be moved by said optical system controlling means for focusing the light beam accurately on the recording medium.

6. A light beam recording device as claimed in claim 4 wherein said second photodetector to receive light diffracted by the recording medium is provided with means for converging the diffracted light thereonto.

7. A light beam recording device as claimed in claim 6 wherein said diffracted light converging means is a convergent lens.

8. A light beam recording device as claimed in claim 6 wherein said diffracted light converging means is a light diffusing plate and a convergent lens to focus the image of the light diffusing plate on the second photodetector.

9. A light beam recording device as claimed in claim 8 wherein said light diffusing plate has an aperture which passes the light passing straight through the recording medium.

10. A light beam recording device as claimed in claim 6 wherein said diffracted light converging means is a mirror to reflect the diffracted light and a convergent lens to receive the light reflected by the mirror and converge the light onto the second photodetector.

11. A light beam recording device as claimed in claim 10 wherein said mirror has an aperture which passes the light passing straight through the recording medium.

12. A light beam recording device as claimed in claim 1 wherein said means for controlling the optical system comprises a control circuit connected with said photoelectric sensing means for generating an output signal which indicates that the light beam is focused on the recording medium, and an electric motor associated with the optical system to move the focusing lens in the optical system in the direction normal to the face of the recording medium in accordance with the signal from the control circuit.

13. A light beam recording device for recording information on a thermoplastic recording medium with a high intensity light beam comprising in combination, a light source which emits a light beam of high intensity which is able to deform a thermoplastic material, an optical system for focusing the light beam on the thermoplastic recording medium, a photoelectric sensing means provided behind the recording medium for receiving light passing through the recording medium, means for controlling said optical system to focus the light beam accurately on the recording medium in accordance with the output of said photoelectric sensing means, an information generating means for generating information to be recorded on the recording medium, means for moving the recording medium in a plane in accordance with the information given by said information generating means, and means for intercepting the light beam emitted by the light source in accordance with the information given by said information generating means, said optical system controlling means being connected with said information generating means and provided with information for operating said light beam intercepting means, whereby the optical system controlling means is operated to stop the optical system when the light beam is intercepted by the light beam intercepting means.

* * * * *